(12) United States Patent
McMenemy

(10) Patent No.: US 9,067,309 B2
(45) Date of Patent: Jun. 30, 2015

(54) AUTOMATICALLY SPEED ADJUSTING RATCHET WRENCH

(71) Applicant: Stanley Black & Decker, Inc., New Britain, CT (US)

(72) Inventor: Mark McMenemy, Northborough, MA (US)

(73) Assignee: Stanley Black & Decker, Inc., New Britain, CT (US)

( * ) Notice: Subject to any disclaimer, the term of this patent is extended or adjusted under 35 U.S.C. 154(b) by 277 days.

(21) Appl. No.: 13/692,580

(22) Filed: Dec. 3, 2012

(65) Prior Publication Data

US 2014/0150610 A1   Jun. 5, 2014

(51) Int. Cl.
*B25B 21/00* (2006.01)
*F16H 57/08* (2006.01)

(52) U.S. Cl.
CPC .............. *B25B 21/004* (2013.01); *B25B 21/00* (2013.01); *F16H 57/082* (2013.01)

(58) Field of Classification Search
USPC ............. 81/57.39, 57, 57.13, 57.29; 173/110, 173/176, 179
See application file for complete search history.

(56) References Cited

U.S. PATENT DOCUMENTS

| | | | |
|---|---|---|---|
| 4,346,630 A | 8/1982 | Hanson | |
| 4,821,611 A * | 4/1989 | Izumisawa | 81/464 |
| 5,142,952 A * | 9/1992 | Putney et al. | 81/57.39 |
| 5,535,646 A | 7/1996 | Allen | |
| 5,535,867 A | 7/1996 | Coccaro | |
| 5,704,434 A | 1/1998 | Schoeps | |
| 6,298,753 B1 | 10/2001 | Izumisawa | |
| 6,578,643 B2 | 6/2003 | Izumisawa | |
| 6,789,448 B2 | 9/2004 | Ono | |
| 6,860,174 B2 | 3/2005 | Kusama | |
| 7,080,578 B2 | 7/2006 | Izumisawa | |
| 7,086,311 B2 | 8/2006 | Liaw | |
| 7,171,873 B2 | 2/2007 | Horvath | |
| 7,475,609 B2 | 1/2009 | Liaw | |
| 8,051,746 B2 | 11/2011 | Bouchard | |
| 8,096,211 B2 | 1/2012 | Cho | |
| 8,117,947 B2 | 2/2012 | Chiang | |
| 2002/0117028 A1 | 8/2002 | Kusama | |
| 2007/0084310 A1 | 4/2007 | Kobayashi | |
| 2008/0142329 A1 | 6/2008 | Kobayashi | |
| 2012/0186400 A1 | 7/2012 | Elger | |

* cited by examiner

*Primary Examiner* — Hadi Shakeri
(74) *Attorney, Agent, or Firm* — Richard J. Veltman; Adan Ayala

(57) ABSTRACT

A two-piece planet carrier for use in a power hand tool, the carrier comprising a drive portion mountable to a rotor of the tool and a pinned portion having a crank pin. The crank pin operatively connectable to a drive shaft of the tool to provide rotation and torque to the drive shaft. The pinned portion rotatably engaged with the drive portion such that rotation of the rotor will cause the drive portion and the pinned portion to rotate relative to each other as a function of a load applied to the drive shaft such that an offset between a crank pin center axis and a drive portion axis of rotation is variable as a function of the load, wherein the variance of the offset will vary a rotational speed and an amount of torque delivered to the drive shaft as a function of the load.

20 Claims, 6 Drawing Sheets

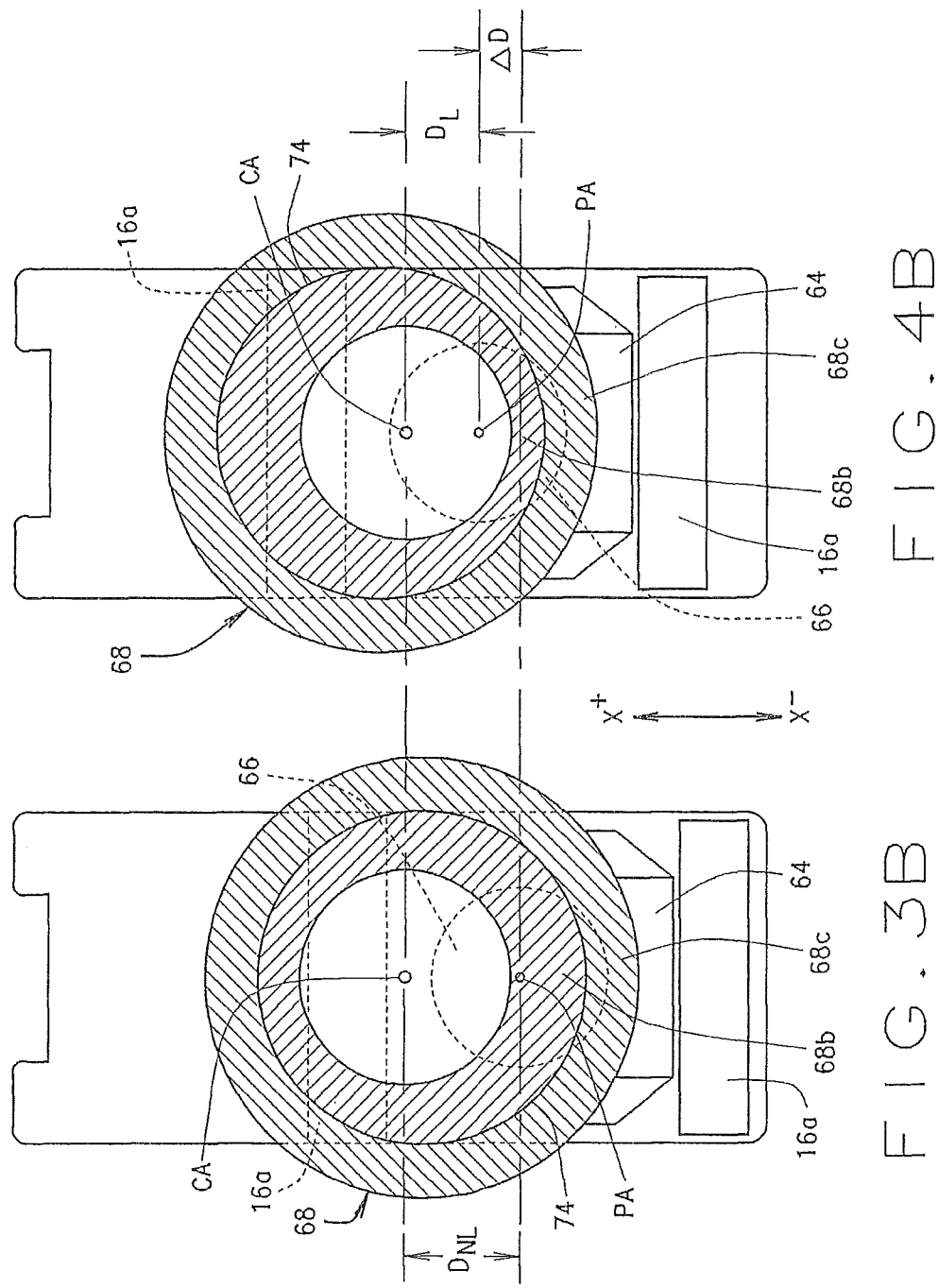

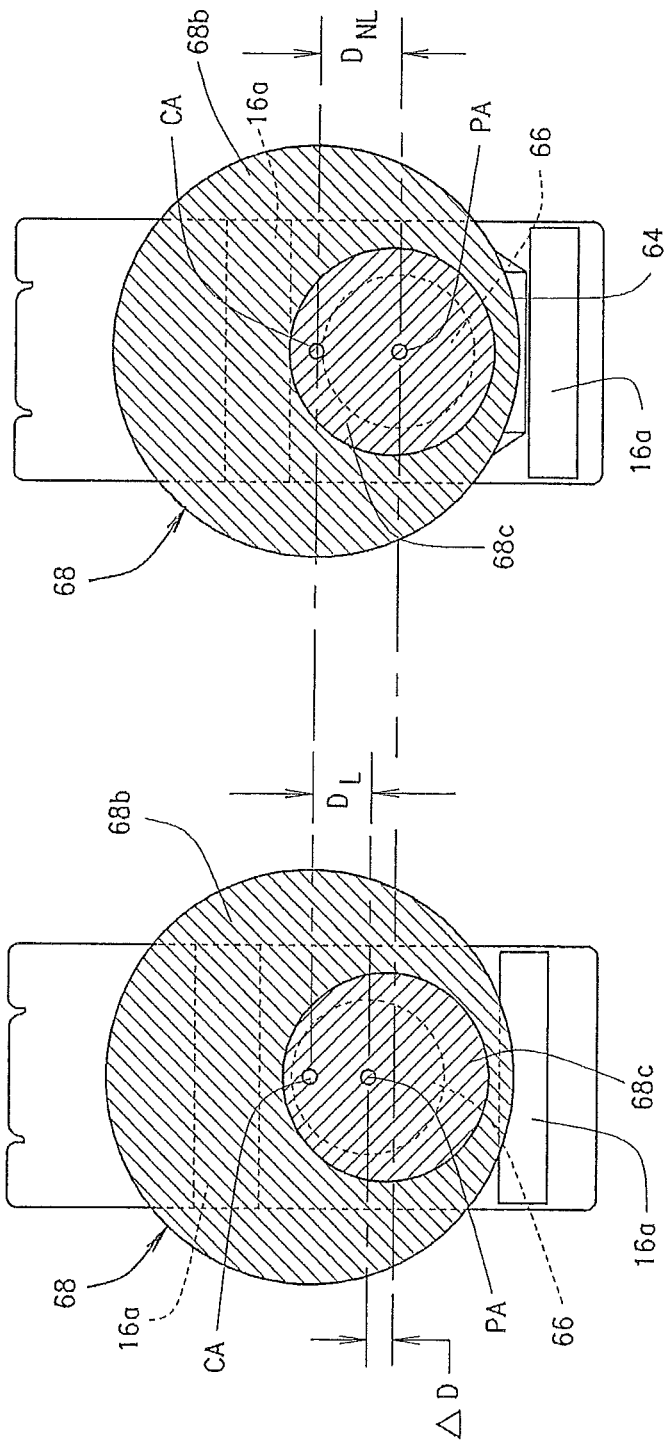

AUTOMATICALLY SPEED ADJUSTING RATCHET WRENCH

FIELD

The present teachings relate to power operated ratchet drive hand tools, and, more particularly, to an automatic speed and torque adjusting bidirectional high-speed power ratchet drive hand tool.

BACKGROUND

The statements in this section merely provide background information related to the present disclosure and may not constitute prior art.

Power operated hand held ratchet drive tools are prevalently used in many industrial settings for installing, tightening, loosening and removing objects such a nuts and bolts. For example, pneumatically and electrically driven ratchet drive tools are commonly used in the automotive industry for such things as installing, tightening, loosening and removing nuts from the wheel lugs of an automobile when removing and mounting wheels from and on the respective automobile.

Typically, the speed and amount of torque delivered by such known ratchet drive tools are either not adjustable. i.e., the ratchet drive tool is structured to operate at single speed and to deliver a single amount of torque, or the power is reduced when the torque is reduced.

Hence, when using such known ratchet drive tools, the user is either unable to adjust the speed and torque of the respective ratchet drive tool, or must manually change the speed, torque and power settings as desired for each particular application/use of the respective ratchet drive tool.

Both the inability to adjust the speed and torque, and the need to manually reconfigure such known ratchet drive tools for each particular application/use, is time consuming, cumbersome and inefficient, and can lead to over-torqueing of the object to which the respective ratchet drive tool is applied.

SUMMARY

In various embodiments, the present disclosure provides a two-piece planet carrier for use in a power hand tool. The planet carrier comprises a drive portion having an axis of rotation and is fixedly mounted to a motor rotor of the tool. The planet carrier additionally comprises a pinned portion including a base and a crank pin extending eccentrically from the base. The crank pin has a center axis and is operatively connectable to a drive shaft of the tool to provide rotation and torque to the drive shaft upon orbital rotation of the crank pin about the drive portion axis of rotation. The pinned portion is rotatably engaged with the drive portion such that rotation of the rotor will cause the drive portion and the pinned portion to rotate relative to each other as a function of a load applied to the drive shaft such that an offset between the crank pin center axis and the drive portion axis of rotation is variable as a function of the load applied to the drive shaft. Moreover, the variance of the offset will vary a rotational speed and an amount of torque delivered to the drive shaft as a function of the load at drive shaft.

In various other embodiments, the present disclosure provides a power rotary hand tool that comprises a drive shaft operatively connectable to a load and a two-piece planet carrier operably connected to the drive shaft. The planet carrier comprises a drive portion having an axis of rotation and is fixedly mounted to a motor rotor of the tool. The planet carrier additionally comprises a pinned portion including a base and a crank pin extending eccentrically from the base. The crank pin has a center axis and is operatively connected to the drive shaft to provide rotation and torque to the drive shaft upon orbital rotation of the crank pin about the drive portion axis of rotation. The pinned portion is rotatably engaged with the drive portion such that rotation of the rotor will cause the drive portion and the pinned portion to rotate relative to each other as a function of a load applied to the drive shaft such that an offset between the crank pin center axis and the drive portion axis of rotation is variable as a function of the load applied to the drive shaft. Moreover, the variance of the offset will vary a rotational speed and an amount of torque delivered to the drive shaft as a function of the load at drive shaft.

In yet other embodiments, the present disclosure provides a bidirectional hand held power ratchet drive tool. The tool comprises a drive shaft fixedly connected to a drive gear, a pair of opposing pawls pivotally connected a drive link, each pawl is alternately and operatively engageable with the drive gear to rotate the drive shaft in response to oscillatory lateral movement of the drive link, and a two-piece planet carrier. The two-piece planet carrier comprises a drive portion that has an axis of rotation and is fixedly mounted to a motor rotor of the tool. The two-piece planet carrier additionally comprises a pinned portion including a base and a crank pin extending eccentrically from the base. The crank pin has a center axis and is rotatably connected with the drive link to provide the oscillatory lateral travel of the drive link upon orbital rotation of the crank pin about the drive portion axis of rotation. The pinned portion is rotatably engaged with the drive portion such that rotation of the rotor will cause the drive portion and the pinned portion to rotate relative to each other as a function of a load applied to the drive shaft such that an offset between the crank pin center axis and the drive portion axis of rotation is variable as a function of the load applied to the drive shaft. Moreover, the variance of the offset will vary a speed and a length of the oscillatory lateral travel of the drive link, thereby varying a rotational speed and an amount of torque delivered to the drive shaft as a function of the load at drive shaft.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Figure 1:
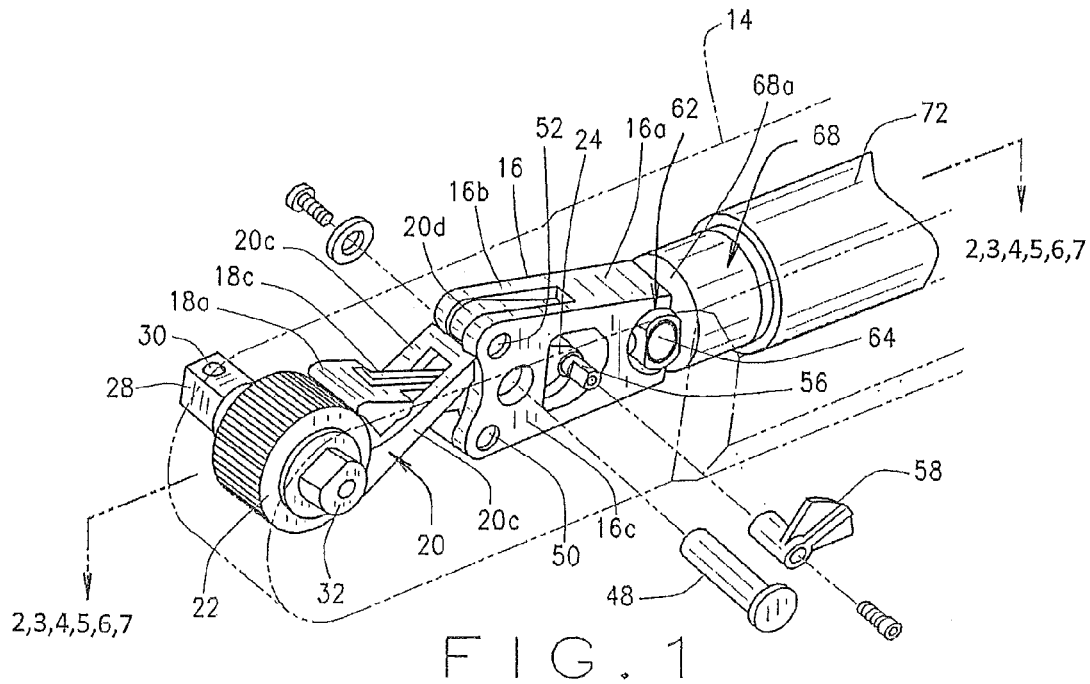
FIG. 1 is an isometric view of a bidirectional high-speed hand held power ratchet drive tool that is structured and operable to automatically adjust a speed and a torque delivered by the tool as a function of the resistance to turning of an object, to which the tool is applied, in accordance with various embodiments of the present disclosure.
Figure 3A:
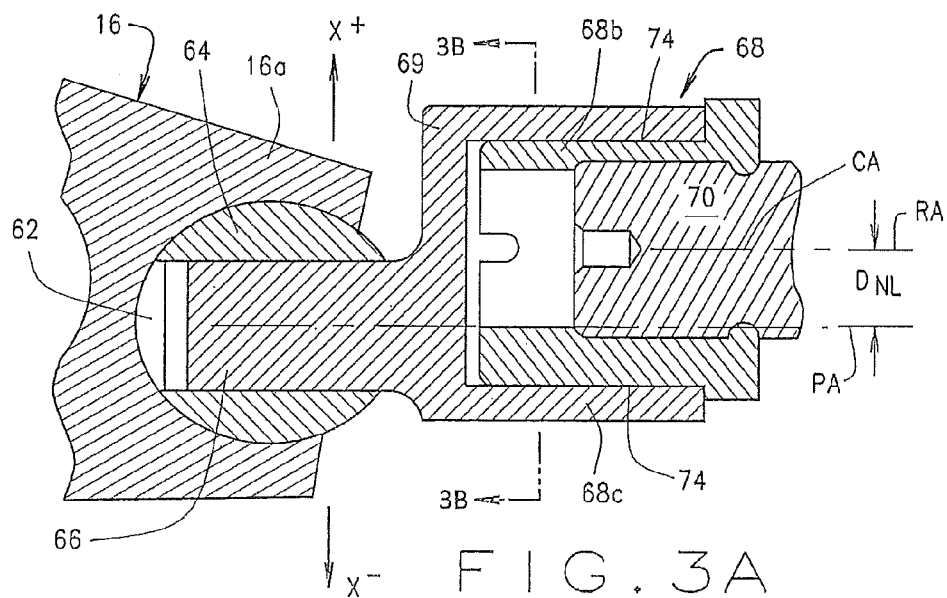

FIG. 3A is a cross-sectional view of a portion of a drive link operatively connected to a two-piece planet carrier of the ratchet drive tool shown in FIG. 1, the two-piece planet carrier having a drive portion disposed within a pinned portion such that the tool will deliver a high speed of rotation and a low torque to a drive shaft of the ratchet drive tool, in accordance with various embodiments of the present disclosure.

FIG. 3B is a cross-sectional view of the two-piece planet carrier of the ratchet drive tool shown in FIG. 1 along line 3B-3B shown in FIG. 3A, in accordance with various embodiments of the present disclosure.

Figure 4A:
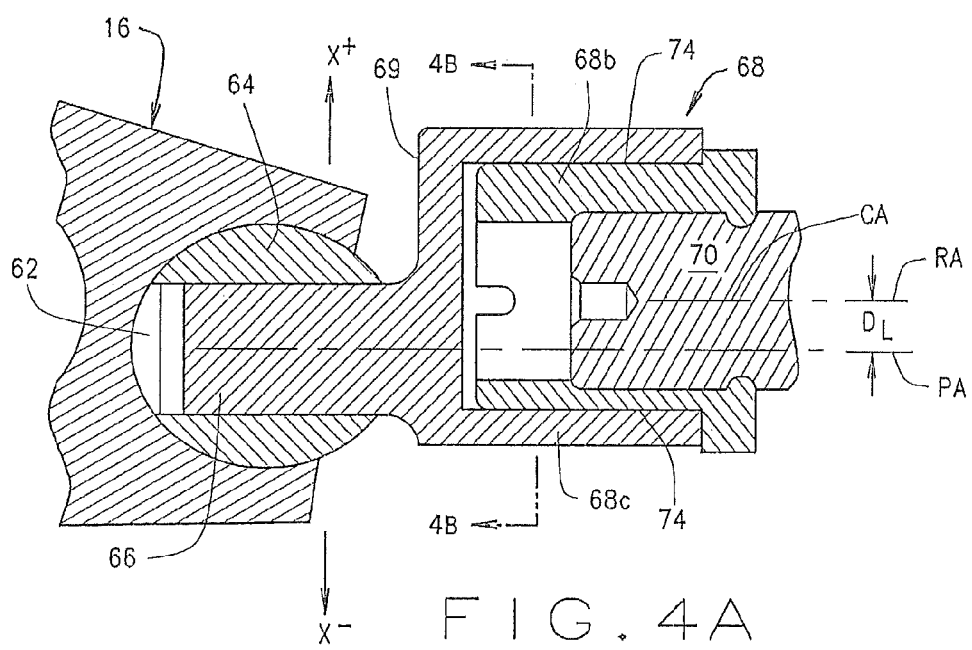

FIG. 4A is a cross-sectional view of the portion of the drive link operatively connected to the two-piece planet carrier of the ratchet drive tool shown in FIG. 1, wherein the drive portion is disposed within a pinned portion such that the tool will deliver a low speed of rotation and a high torque to the drive shaft of the ratchet drive tool, in accordance with various embodiments of the present disclosure.

FIG. 4B is a cross-sectional view of the two-piece planet carrier of the ratchet drive tool shown in FIG. 1 along line 4C-4C shown in FIG. 4A, in accordance with various embodiments of the present disclosure.

Figure 5:
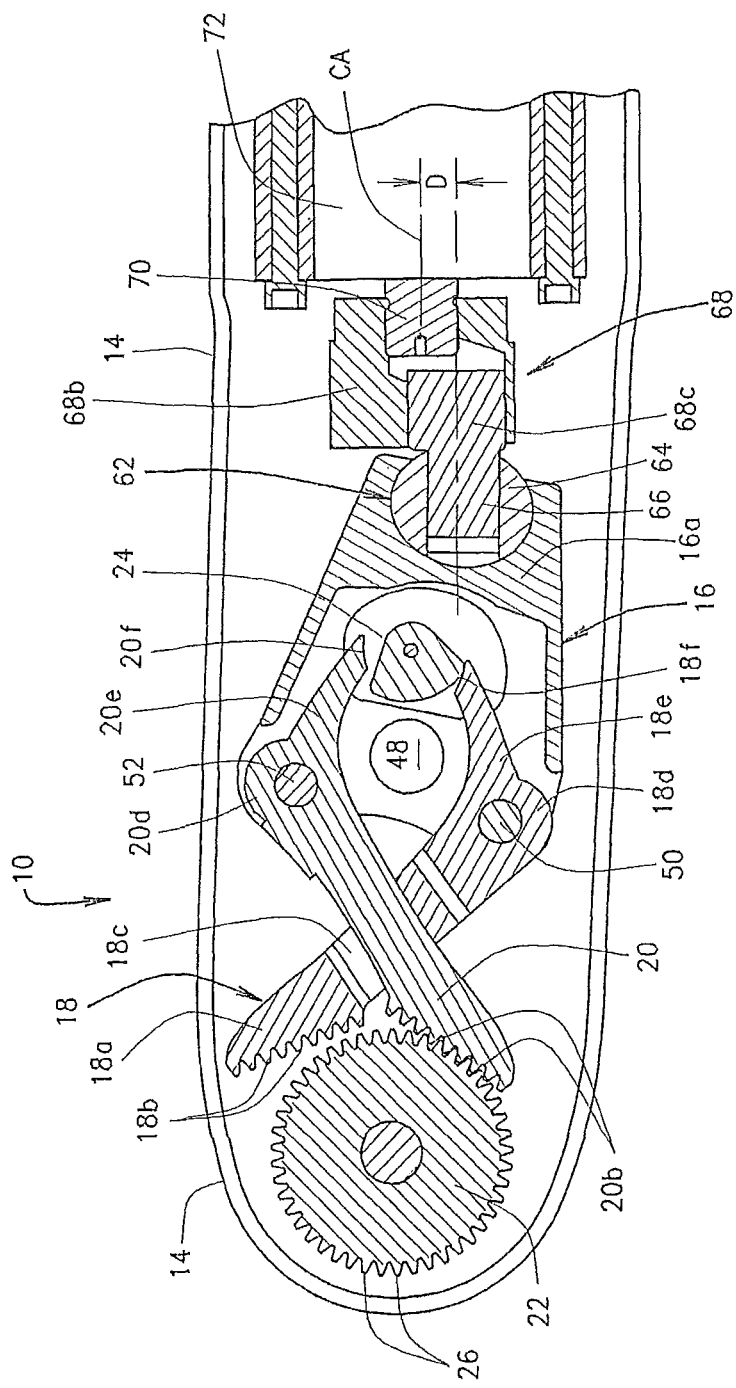

FIG. 5 is a cross-sectional view of the ratchet drive tool shown in FIG. 1, in accordance with various other embodiments of the present disclosure.

Figure 6A:
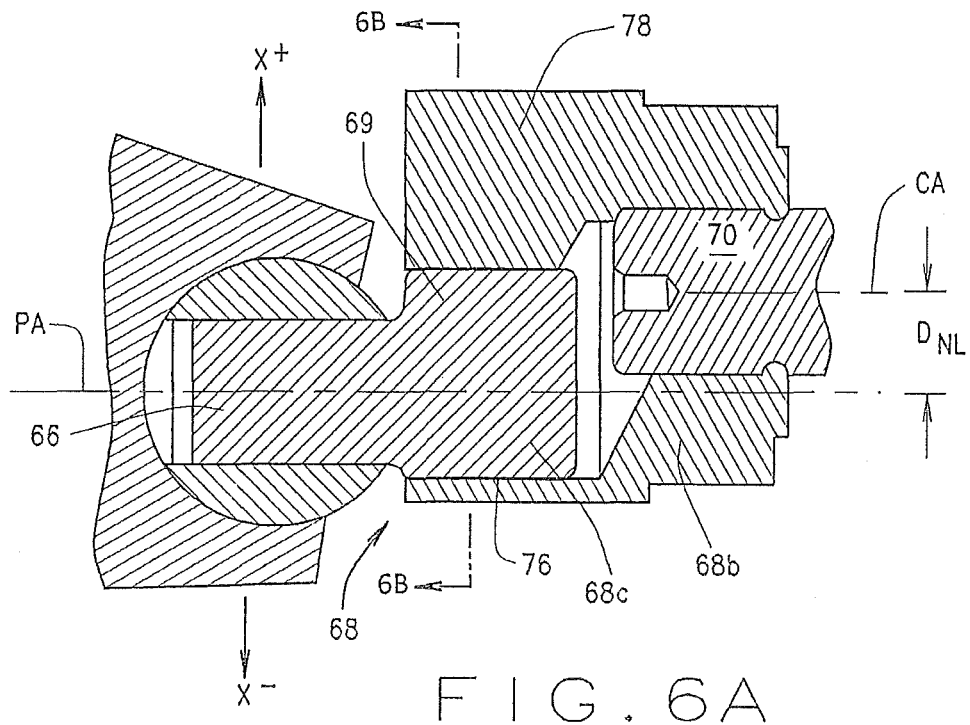

FIG. 6A is a cross-sectional view of a portion of a drive link operatively connected to a two-piece planet carrier of the ratchet drive tool shown in FIG. 1, the two-piece planet carrier having a pinned portion disposed within a receptacle of a drive portion such that the tool will deliver a high speed of rotation and a low torque to a drive shaft of the ratchet drive tool, in accordance with various embodiments of the present disclosure.

FIG. 6B is a cross-sectional view of the two-piece planet carrier of the ratchet drive tool shown in FIG. 1 along line 6B-6B shown in FIG. 6A, in accordance with various embodiments of the present disclosure.

Figure 7A:
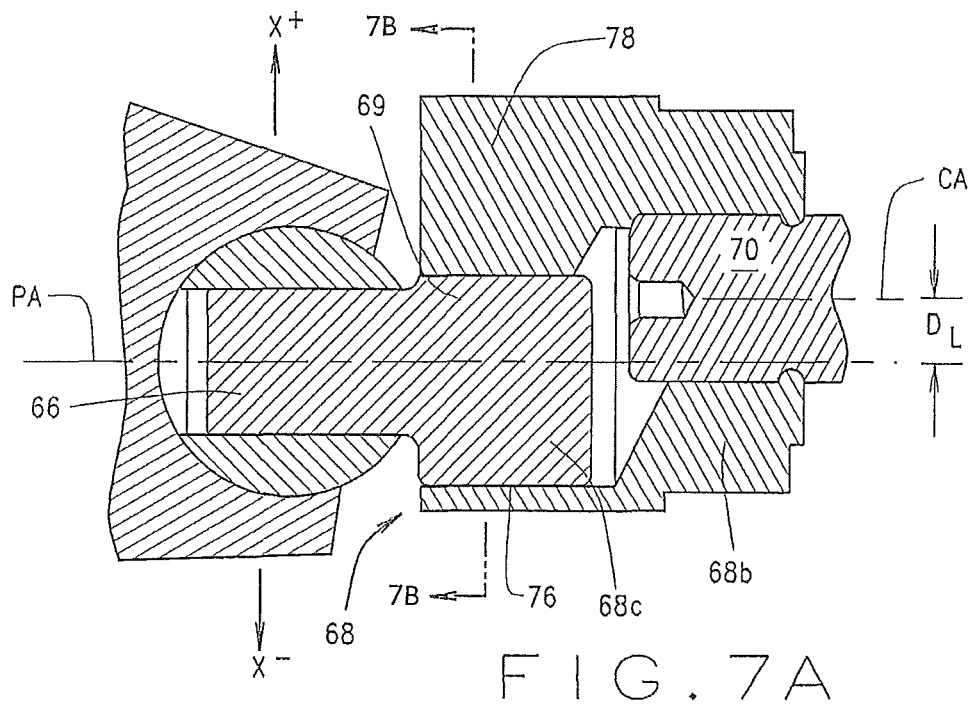

FIG. 7A is a cross-sectional view of the portion of the drive link operatively connected to the two-piece planet carrier of the ratchet drive tool shown in FIG. 1, wherein the pinned portion is disposed within the receptacle of the drive portion such that the tool will deliver a low speed of rotation and a high torque to the drive shaft of the ratchet drive tool, in accordance with various embodiments of the present disclosure.

FIG. 7B is a cross-sectional view of the two-piece planet carrier of the ratchet drive tool shown in FIG. 1 along line 7B-7B shown in FIG. 7A, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Referring to FIG. 1, the present disclosure provides a bidirectional high-speed hand held power ratchet drive tool 10 that is structured and operable to automatically adjust a speed and a torque delivered by the tool 10 based on the resistance to turning of an object, e.g., a nut or a bolt, to which the tool 10 is operatively connected. The resistance to turning of the object to which the tool 10 is operatively connected is sometimes referred to herein as the load on to the tool 10. Particularly, based on the amount of resistance to turning of an object to which the tool 10 is applied, the tool 10 will automatically adjust the torque delivered by the tool 10 to provide the amount of torque needed to loosen the respective object. Furthermore, once the respective object is 'broken loose' and begins to turn, the tool 10 will automatically reduce the amount of torque being delivered and increase the speed of rotation at which the tool 10 turns the respective object. Similarly, when installing an object, the tool 10 will begin the installation by delivering sufficient torque to turn the object at a high speed and then subsequently automatically lower the speed and increase the torque delivered as the object begins to resist turning, whereby the amount torque delivered is based on the resistance to turning of the object. Moreover, the tool 10 will automatically increase and decrease the torque delivered, as needed, throughout the entire installing/tightening and loosening/removing processes, based on change is resistance to turning of the respective object during such processes.

For example, if the tool 10 is utilized to remove a lug nut from an automotive wheel lug, based on the tightness (resistance to turning) of the lug nut, the tool 10 will automatically adjust to deliver sufficient torque to loosen the lug nut, and then without removing the tool 10 from the lug nut or manually changing a speed and/or torque setting, the tool 10 will automatically reduce the amount of torque being delivered and increase the rotation speed delivered to lug nut to quickly and efficiently remove the lug nut. Similarly, if the tool 10 is utilized to install and lug nut on an automotive wheel lug, the tool will initially thread the lug nut onto the lug at a high speed delivering low torque (but, sufficient torque to turn the lug nut on the lug). Then, as the lug nut begins to resist turning the initial speed, e.g., as the lug nut begins to tighten the wheel onto the respective brake rotor or drum, without removing the tool 10 from the lug nut or manually changing a speed and/or torque setting, the tool 10 will automatically increase the amount of torque being delivered and decrease the rotation speed delivered to lug nut to quickly and efficiently securely tighten the lug nut and secure the wheel to brake rotor or drum.

Figure 2:
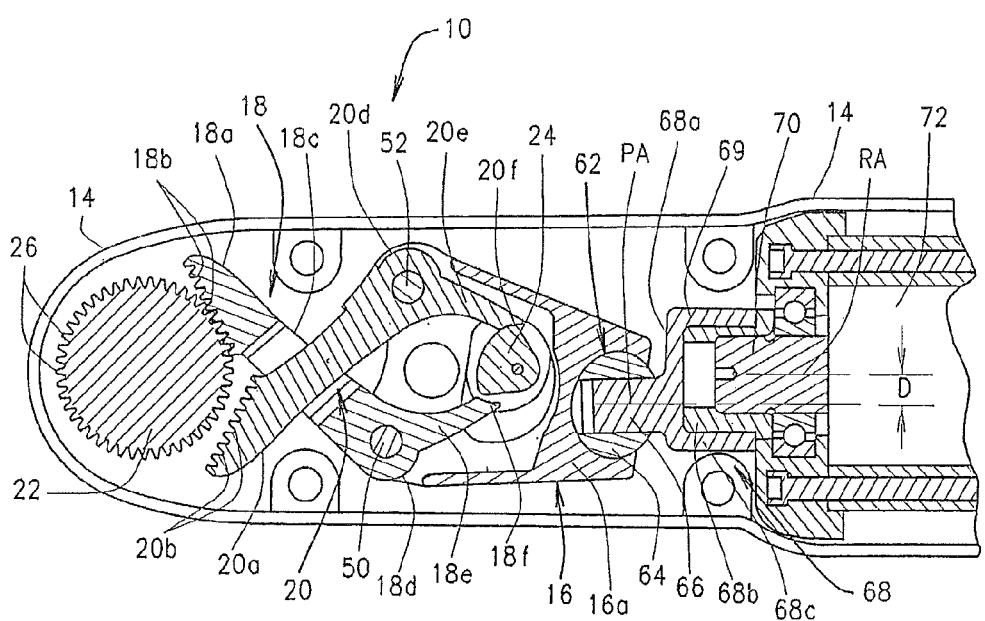
FIG. 2 is a cross-sectional view of the ratchet drive tool shown in FIG. 1 along line 2,3,4,5,6,7-2,3,4,5,6,7 in accordance with various embodiments of the present disclosure.

Referring now to FIGS. 1 and 2, the tool 10 generally includes a drive link 16 to which is pivotally connected a single arm pawl 18 and a double arm pawl 20, either of which pawls 18 or 20 is in toothed contact with an annular drive gear 22, depending upon the selected position of a reversing cam 24, as described below. In various implementations, the drive link 16 is pivotally connected to a tool housing 14 via a pivot post 48 that passes transversely and rotatably through the housing 14. All of these elements and others to be described which are necessary for the proper connection and function of the tool 10 are housed in the forward end of the tool housing 14. The drive gear 22 is enclosed in the extreme forward end of tool housing 14 and is positioned such that teeth 26 formed longitudinally on the exterior circumferential surface of the drive gear 14 are transverse in relation to the longitudinal axis of the tool. An integral and preferably square drive shaft 28 extends axially outwardly from the center of drive gear 22 to one side thereof and beyond the confines of housing 14, so as to be available to engage a socket (not shown) or other item for ratchet turning thereof. A ball and spring assembly 30 of known variety facilitates the connection of the drive shaft 28 to the object to be turned. On an opposing side of drive gear 22, directly opposite and coaxial to the square drive shaft 28, an integral extension 32 (which may also be considered to be an inner end of the drive gear shaft) is provided.

Single arm pawl 18 includes a head portion 18a which has a flat forwardly facing surface with a plurality of parallel teeth 18b formed thereon for selective movable interaction with the plurality of teeth 26 on the outer surface of drive gear 22. Single arm pawl head 18a is supported at the extreme forward end of a single pawl arm 18c which extends substantially longitudinally, rearwardly toward an elbow or angled portion 18d at which the single arm pawl 18 is pivotally connected to the drive link 16 by a pin 50. A second arm or straight section 18e extends from angled portion 18d rearwardly to a rearwardly directed pawl tip 18f that provides a contact point or surface for the cam 24. Double arm pawl 20 likewise has a head portion 20a with a forward facing flat surface bearing a plurality of parallel, transversely disposed teeth 20b which are sized and spaced appropriately for selective movable interaction with teeth 26 on the annular outer surface of the drive gear 26. Paired, spaced-apart parallel pawl arms 20c, 20c' extend substantially longitudinally and rearwardly from opposed sides of pawl head 20a to a shared elbow or angled portion 20d, at which pawl 20 is pivotally connected by a pin 52 to drive link 16. From the angled portion 20d pawl 20 continues to extend substantially rearwardly via a second arm or straight section 20e which terminates in pawl tip 20f that provides a contact point or surface for the cam 24.

As illustrated in FIG. 1, the single arm pawl arm 18c extends rearwardly between paired, spaced-apart double armed pawl arms 20c, 20c' so that as pawls 18 and 20 move they interact with one another in a scissors-like fashion, with the respective heads 18a and 20a opening in a mouth-like fashion toward the annular, toothed surface of drive gear 22. A torsion spring (not shown) is wrapped around the pivot post 48 and the legs thereof extend forwardly, to slidably brace against the rearwardly and outwardly directed surfaces of pawls 18 and 20 at or just rearwardly of the heads 18a and 20a thereof to thereby bias the pawl heads 18a and 20a toward the drive gear 22.

Which of the pawl heads 18a and 20a is in contact with the gear teeth 26 depends upon whether the tool 10 is being operated in a forward or a reverse mode, as determined by the position of the reversing cam 24. In various embodiments, the reversing cam 24 can have an outwardly extending stem 56 over which a reverse lever 58 is fitted and fixedly connected thereto.

Thus, if it is desired to operate tool 10 to cause ratcheting rotation of drive gear 22 in one direction, the cam lever 58 is set so that the reversing cam 24 is in contact with one of pawl ends 18f or 20f to prevent the corresponding pawl head 18a or 20a from contacting the drive gear 22 and the respective pawl 18 or 20 from moving pivotally as the drive link 16 moves. The other pawl 18 or 20 having its respective free end 18f or 20f unblocked by cam 24 can then extend forwardly, via the biasing torsion spring, so that the associated head 18a or 20a is in contact with drive gear 22 and will necessarily move as the drive link 16 moves to cause ratcheting rotation of the drive gear 22.

Drive link 16 comprises a solid body portion 16a, having integral paired parallel plates 16b and 16c. Plates 16b and 16c extend forwardly within tool housing 14 and are spaced apart from one another a sufficient distance to receive pawl elbows 18d and 20d therebetween, at the forwardly directed lower and upper corners thereof. Appropriately sized and positioned, coaxially aligned apertures are formed transversely through plates 16b and 16c for receipt of the pivot post 48, the pivot pins 50 and 52, and the reversing cam 24. The drive link 16 further includes a transverse, arcuately shaped opening 62 disposed in a rearwardly directed portion of the body 16a. Opening 62 receives a drive bushing 64 than is sized and shaped for smooth rotational movement within the opening or groove 62. Drive bushing 64 is structured to receive a crank pin 66 than extends longitudinally forward from a rotatable planet carrier 68 of the tool 10. Particularly, the crank pin 66 is disposed eccentrically on a front face 68a of the planet carrier 68. That is, the crank pin 66 extends from the front face 68a offset from a center of the plant carrier 68. The planet carrier 68 is operatively connected to a rotor 70 of a motor 72 of the tool 10, wherein the rotor 70 has a longitudinal center axis RA. Moreover, the carrier 68 is operatively connected to a rotor 70 such that rotation of the motor rotor 70 causes the carrier 68 to rotate, as described further below. Rotation of the carrier 68 in turn orbitally rotates the crank pin 66 about the center axis RA of the rotor 70. Consequently, the orbital rotation of the crank pin 66 imparts movement on the bushing 64 causing the front and rear portions of the drive link 16 to pivotally oscillate laterally up and down in the X$^+$ and the X$^-$ directions (shown in FIGS. 3A through 4B) about the pivot post 48 in a seesaw-like manner.

More specifically the drive link 16 is transversely and rotatably penetrated by pivot pin 48 at a point forward of cam 24 and between and rearward of pawl elbows 18d and 20d. Accordingly, the drive link 16 is movably connected within housing 14 such that the orbital rotation of the crank pin 66 will cause the drive link 16 to oscillate in a seesaw-like manner about pin 48 and thereby cause pawls 18 and 20 to pivotally oscillate about pins 50 and 52.

In various embodiments, the pawls 18 and 20 can pivotally oscillate about the pins 50 and 52 at speeds of up to approximately 4,000 to 5,000 RPM when the motor rotor 70 is operating in the range of 20,000 to 25,000 RPM. However, due to the structure and position of reversing cam 24 between pawl ends 18f and 20f, at any given time, only one of the pawls 18 and 20 will be in contact with the drive gear 22, whereby such contact will cause rotation of the drive gear 22 and the drive shaft 28. Moreover, the rotation of the drive shaft 28 will deliver a rotational speed and a torque to an object, such as a nut or bolt, to which the drive shaft 28 is operatively connected, e.g., via a socket. Importantly, as described further below and as should be readily understood by one skilled in the art, the speed of rotation and torque delivered by the drive shaft 28 will be a function of a length or distance of an offset D between the center axis RA of the rotor 70 and a center axis PA of the crank pin 66. Specifically, the longer or greater the offset D, the higher the rotational speed of drive shaft 28 will be and the lesser the torque delivered by the draft shaft 28 will be. While conversely, the shorter or lesser the offset D, the lower the rotational speed of drive shaft 28 will be and the greater the torque delivered by the draft shaft 28 will be.

Further details regarding the general components of the tool 10 and their respective functions and cooperation are described in U.S. Pat. No. 5,535,646, which is incorporated herein by reference.

Referring now to FIGS. 2, 3A, 3B, 4A and 4B, in various embodiments, the planet carrier 68 has a two-piece construction comprising a drive portion 68b disposed within a pinned portion 68c having the crank pin 66 extending eccentrically from a base 69 thereof. Particularly, the drive portion 68b is rotatably disposed within a hollow interior of a base 69 of the pinned portion 68c. The drive portion 68b is fixedly mounted to the rotor 70 such that rotation of the rotor 70 will rotate the drive portion 68b, whereby the drive portion 68b will drive the rotation of the pinned portion 68c, i.e., cause the pinned portion 68c to rotate, as described below. Particularly, the drive portion 68b is disposed within the pinned portion 68c such that there is sliding frictional contact at an interface 74 between an outer surface of the drive portion 68b and an inner surface of the pinned portion 68c, sometimes referred to herein as the frictional interface 74. Generally, the drive portion 68b is fixedly mounted to the rotor 70 such that rotation of the rotor 70 will rotated the drive portion 68b. The frictional forces at the frictional interface 74 between the drive and pinned portions 68b and 68c and the eccentricity of the outer surface of drive portion 68b relative to RA will in turn cause the pinned portion 68c to rotate, thereby orbitally rotating the crank pin 66 about the rotor axis RA, which in turn will deliver rotation and torque to the drive shaft 28 (shown in FIG. 1). Since the drive portion 68b is fixedly connected to the rotor 70, the drive portion 68b has an axis of rotation CA that is collinear with the rotor center axis RA about which the rotor 70 rotates. Hence, when pinned portion 68c is rotating, the crank pin 66 will orbitally rotate about the drive portion axis of rotation CA.

Importantly, the frictional contact at the interface 74 allows the drive portion 68b to slip within and relative to the pinned portion 68c and rotate a radial distance that is less than 360°, e.g., rotate a radial distance between 0° and 355°, when the resistance to rotation of the pinned portion 68c is such that the rotational force applied by the rotor 70 to the drive portion 68b overcomes the frictional forces generated at the interface 74 and outward centrifugal forces of drive portion 68b. As will be readily understood by one skilled in the art, based on the interconnections of the drive shaft 28, the drive gear 22, the pawls 18 and 20, the drive link 16 and the crank pin 66, the resistance to rotation of pinned portion 68c results from the respective load on drive gear 22 generated by the resistance to rotate of the object to which the drive shaft 28 is operatively connected, e.g., a nut or bolt. Hence, the load on the drive shaft 28 is transferred to the pinned portion 68c causing resistance to rotation of the pinned portion 68c that is a function of the respective load on the drive shaft 28. Therefore, the drive portion 68b will rotate a radial distance less than 360°, e.g., between 0° and 355°, within the pinned portion 68c based on the resistance to rotation of the pinned portion 68c caused by the resistance to rotation of object to which the drive shaft 28 is operatively connected, i.e., the load on the drive shaft 28.

The drive portion 68b comprises a sidewall that is structured such that a portion of the sidewall is thicker than a diametrically opposing portion of the sidewall, as illustrated in FIGS. 3A, 3B, 4A and 4C. Particularly, the sidewall of the drive portion 68b is structured such that an inner surface thereof is centered about and equidistant from the axis of rotation CA, while an outer surface thereof is eccentrically disposed about and non-equidistant from the axis of rotation CA. The drive portion 68b therefore has a cam-shaped outer surface that will rotate eccentrically relative to the drive portion axis of rotation CA. The crank pin 66 center axis PA is longitudinally oriented within the tool housing 14, as is the drive portion axis of rotation CA.

As described above, the drive portion 68b is able to slip, or rotate, within the pinned portion 68c less than 360° in a frictionally sliding manner based on the amount of load applied to the drive shaft 28, which is transferred to the pinned portion 68c so that the pinned portion 68c resists rotation, as a function of the load on the drive shaft 28.

For example, with reference to FIGS. 3A and 3B, when the tool motor 72 is not operated or operated to rotate the rotor 70 when there is no load on the drive shaft 28, as in the case where the drive shaft 28 is not operatively engaged with an object to be turned, e.g. not operatively connected to a nut or bolt to be tightened or loosened, the resistance to turning of the drive shaft 28 and drive gear 22, and hence the resistance to rotation of the pinned portion 68c, will be relatively minimal. Such minimal resistance will be generated only by the internal frictional forces created by the cooperative operation of the components of the tool 10. In such instances, the frictional forces at the interface 74 between the drive and pinned portions 68b and 68c and the radially outward centrifugal force of crank pin 66 will generally be greater than the resistance to rotation of the pinned portion 68c. In fact, the centrifugal force ensures that crank pin 66 will be in the radially outermost configuration until a sufficiently significant load is applied to drive gear 22. Therefore, this outermost crank pin position corresponds to the high speed low torque configuration and is the default position when there is no load on the tool. Therefore, in the default position the drive portion 68b will not, or will only slightly, rotate within the pinned portion 68c. That is, the drive portion will not, or will only slightly, rotate relative to pinned portion 68c away from the default position. Accordingly, as the motor rotor 70 rotates, and the load increases the frictional forces at the frictional interface 74 will cause or allow increased relative rotation of the pinned portion 68b.

As described above, the speed of rotation and torque delivered at the drive shaft 28 will be a function of the offset D between the center axis PA of the crank pin 66 and the drive portion axis of rotation CA (recalling that the drive portion axis of rotation CA is collinear with the center axis RA of the rotor 70). Specifically, the longer or greater the offset D, the higher the rotational speed of drive shaft 28 will be and the lesser the torque delivered by the draft shaft 28 will be. While conversely, the shorter or lesser the offset D, the lower the rotational speed of drive shaft 28 will be and the greater the torque delivered by the draft shaft 28 will be.

Importantly, as illustrated in FIGS. 3A and 3B, the drive portion 68b is disposed within the pinned portion 68c such that when there is no load on the drive shaft 28, i.e., substantially no slipping between the drive and pinned portions 68b and 68c, the offset D will have a maximum length, illustrated and referred to herein as D no-load ($D_{NL}$). The orientation of the drive portion 68b within the pinned portion 68c when offset D is equal to $D_{NL}$, will be referred to herein as the default or 'Home' position of the drive portion 68b. As will be readily understood by one skilled in the art, when the tool motor 72 is operated to rotate the rotor 70 and the offset D has the maximum length $D_{NL}$, the radius of orbital rotation of the crank pin center axis PA about the rotor center of axis RA will be equal to $D_{NL}$. Consequently, the orbital rotation of the crank pin 66 will generate a maximum length of oscillatory lateral travel or movement of the drive link 16 in the $X^+$ and $X^-$ directions (shown in FIGS. 3A through 4B). This, in turn, will generate a maximum stroke length of the respective pawl 18 or 20, which in turn will maximally rotate the drive gear 26 with each pawl stroke, thereby delivering the highest rate of rotation and the least amount of torque to the drive shaft 28 deliverable by the tool 10.

On the other hand, as illustrated in FIGS. 4A and 4B, when the tool motor 72 is operated to rotate the rotor 70 and there is a load applied the drive shaft 28, as in the case where the drive shaft 28 is operatively engaged with an object to be turned, e.g. operatively connected to a nut or bolt to be tightened or loosened, the resistance to rotation of the drive shaft 28 and drive gear 22, and hence the resistance to rotation of the pinned portion 68c will be a function of the load. That is, the greater the load is, the greater the resistance to turning of the pinned portion 68c will be. In such instances, the drive portion 68b will be initially disposed within the pinned portion 68c at the Home position such that D is substantially equal to $D_{NL}$. When D is substantially equal to $D_{NL}$, and a load is applied to the drive shaft 28 such that the frictional forces at the interface 74 between the drive and pinned portions 68b and 68c and the outward centrifugal force of crank pin 66 are less than the resistance to rotation of the pinned portion 68c, the torque delivered to the drive portion 68b by the rotor 70 will cause the drive portion 68b to begin to rotate, or slip, within the pinned portion 68C.

As described above, the drive portion 68b has a cam-shaped cross-section wherein one portion of the drive portion sidewall is thicker than a diametrically opposed portion, which will cause the drive portion outer surface to rotate eccentrically relative to drive portion axis of rotation CA. Therefore, due to the eccentric rotation of the drive portion outer surface, as the drive portion 68b rotates within the pinned portion 68c, the frictional forces at the frictional interface 74 will steadily increase. Specifically, as the drive portion 68b rotates within the pinned portion 68c, the frictional forces at the frictional interface 74 will steadily increase until the interface frictional forces are greater than the resistance to rotation of the pinned portion 68c, caused by the load on the drive shaft 28 and the radially outward centrifugal forces of crank pin 66. Once the interface frictional forces overcome the load based resistance to rotation of the pinned portion 68c and the radially outward centrifugal forces of crank pin 66, the pinned portion 68c will begin to rotate along with the drive portion 68b and deliver rotation and torque to the drive shaft 28.

Moreover, due to the eccentric rotation of the drive portion outer surface within the pinned portion 68c, the length of offset D between drive portion axis of rotation CA and the center axis of the crank pin PA will continuously shorten as the drive portion 68b rotates within the pinned portion 68c, i.e., as the drive portion 68b rotates relative to the pinned portion 68c. That is, the length of the offset D will be reduced as a function of the amount of rotation of the drive portion 68b within the pinned portion 68c away from the Home position. The shortened length of the offset D, when a load is applied to the drive shaft 28, will be illustrated and referred to herein as D load ($D_L$). Furthermore, the change in the length of offset D as a function of the load is illustrated (shown in FIG. 4B) and referred to herein as delta D ($\Delta D$). ($\Delta D$) is 0.0 in the Home configuration.

As will be readily understood by one skilled in the art, the greater the load, the greater the interface frictional forces will need to be to overcome the load based resistance to rotation of the pinned portion 68c. Thus, the greater the load based resistance to rotation of the pinned portion 68c, the further the drive portion 68b will need to rotate within the pinned portion 68c, away from the Home position, to generate the interface frictional forces necessary to overcome the load based resistance to rotation of the pinned portion 68c.

As described above, the speed of rotation and the torque delivered at the drive shaft 28 will be a function of the offset D. Therefore, as the offset D changes, i.e., as $\Delta D$ increases and decreases, the speed of rotation and the torque delivered at the drive shaft 28 will increase and decrease as a function of the $\Delta D$. Particularly, the greater the value of $\Delta D$, the slower speed the rotational of the drive shaft 28 will be, and the greater the torque delivered by the draft shaft 28 will be. And conversely, the lesser the value of $\Delta D$, the faster speed the rotational of the drive shaft 28 will be, and the lesser the torque delivered by the draft shaft 28 will be More specifically, when the drive shaft 28 is operatively connected to an object to be turned and the tool motor 72 is operated to rotate the rotor 70, based the load at the drive shaft 28, i.e., the resistance to turning of the object that is transferred to the pinned portion 68c, the drive portion 68b will begin to rotate within the pinned portion 68c away from the Home position. As the drive portion 68b rotates away from the Home position $\Delta D$ increases, thereby decreasing the radius of orbital rotation of the crank pin center axis PA about the rotor center of axis RA. Consequently, as the radius of orbital rotation of the crank center axis PA decreases, the orbital rotation of the crank pin 66 will generate less and less oscillatory lateral travel of the drive link 16 in the $X^+$ and the $X^-$ directions, as illustrated in FIG. 4B. This, in turn will decrease stroke length of the respective pawl 18 or 20, which in turn will reduce the rotation of the drive gear 26 with each pawl stroke, thereby delivering a slower rate of rotation and an increased amount of torque to the drive shaft 28.

Furthermore, when the load at the drive shaft 28 reduces, i.e., when the object operatively connected to the drive shaft 28 begins to turn with less resistance, the resistance to turning of the pinned portion 68c will also reduce as a function of the reduction in load. Consequently, the frictional forces at the frictional interface 74 between the drive and pinned portions 68b and 68c required to rotate the pinned portion 68c will reduce as a function of the reduction in load. Moreover, as the amount of interface frictional forces required to rotate the pinned portion reduces, the drive portion 68b will rotate within the pinned portion 68c back toward the Home position until the interface frictional forces are substantially equal to, or slightly greater than, the interface frictional forces needed to overcome the resistance to rotation of the pinned portion 68c.

As the drive portion 68b rotates back toward the Home position, $\Delta D$ will decrease, thereby increasing the radius of orbital rotation of the crank pin center axis PA about the rotor center of axis RA. Consequently, as the radius of orbital rotation of the crank pin center axis PA increases, the orbital rotation of the crank pin 66 will generate more and more oscillatory lateral travel of the drive link 16 in the $X^+$ and the $X^-$ directions, as illustrated in FIG. 3B. This, in turn will increase the stroke length of the respective pawl 18 or 20, which in turn will increase the rotation of the drive gear 26 with each pawl stroke, thereby delivering a faster rate of rotation and a decreased amount of torque to the drive shaft 28.

Hence, when operation of the motor 72 delivers a consistent amount of power to tool rotor 70, the rotational speed and amount of torque delivered to the drive shaft 28 at any given time, is a function of $\Delta D$, which is in turn a function of the amount of rotation of the drive portion 68b within the pinned portion 68c, which is in turn a function of the resistance to turning of the pinned portion 68c, which is in turn a function of the load to which the drive shaft 28 is operatively connected, i.e., the resistance to turning of the object to which the drive shaft 28 is operatively connected.

For example, if a user desires to loosen a tight nut, it would be desirous that the tool 10 initially deliver large torque to the drive shaft 28, even if some rotational speed need be sacrificed. Conversely, as the nut is loosened, torque becomes less necessary and rotational speed can be prioritized over torque. Hence, once the drive shaft 28 is operatively connected to such a nut to be loosened and the motor 72 is operated to turn the drive portion 68b, the initial resistance to turning of the nut, i.e., the initial load, will cause the drive portion 68b to rotate within the pinned portion 68c away from the Home position and thereby increase $\Delta D$ which, as described above, will deliver greater torque to the drive shaft 28. Specifically, the drive portion 68b will continue to rotate within the pinned portion 68c until the increase in $\Delta D$ causes sufficient torque to be provided to the nut to begin turning the nut slowly. Then, once the nut begins to turn, the load based resistance to turning of the pinned portion 68c will decrease allowing the drive portion 68b to rotate within the pinned portion back toward the Home position, thereby decreasing $\Delta D$, which will reduce the torque delivered to the drive shaft 28 and increase the rotational speed of the drive shaft 28.

Accordingly, the speed of rotation and the amount of torque delivered to the drive shaft 28 will automatically increase and decrease as a function of the load on the drive shaft 28, i.e., as a function of the resistance to turning of the object to which the drive shaft 28 is operatively connected. That is, as the resistance to turning of the object operatively connected to the drive shaft 28, i.e., the load, varies, the amount of resistance to turning of the pinned portion 68c will correspondingly vary, which will correspondingly cause the drive portion 68b to rotate within the pinned portion 68c away from or toward the Home position. Such rotation of the drive portion 68b within the pinned portion 68c will correspondingly vary the value of ΔD, which will correspondingly vary the radius of orbital rotation of the crank pin 66, which with will cause a corresponding increase or decrease the rotational speed and amount of torque delivered to the drive shaft 28.

Referring now to FIGS. 5, 6A, 6B, 7A and 7B, in various other embodiments, the pinned portion 68c is rotatably disposed within a receptacle 76 eccentrically disposed within a head 78 of the drive portion 68b, i.e., the receptacle 76 is offset within the head 78 with respect to the drive portion axis of rotation CA. Particularly, the pinned portion 68c is disposed within the receptacle 76 such that the pinned portion 68c can freely rotate within the receptacle 76. As with the previous embodiments, the drive portion 68b is fixedly connected to the rotor 70 and the crank pin 66 of the pinned portion 68c extends eccentrically from the base 69 thereof. Accordingly, rotation of the drive portion 68b, via rotation of the rotor 70, will cause the pinned portion 68c to orbitally rotate around the drive portion axis of rotation CA. Importantly, as described further below, the pinned portion 68c will rotate within the receptacle 76 based on the load on the drive shaft 28 (shown in FIG. 1). Rotation of the pinned portion 68c within the receptacle 76 will in turn cause the center axis PA of the eccentric crank pin 66 to move radially inward or outward with respect to the drive portion axis of rotation CA, thereby changing the length of offset D, i.e., increasing or decreasing ΔD, and affecting the speed of rotation and the amount of torque delivered to the drive shaft 28. Hence, the speed of rotation and the amount of torque delivered to the drive shaft 28 will automatically increase and decrease as a function of the load on the drive shaft 28.

Referring now to FIGS. 6A and 6B, as described above, the pinned portion 68c is disposed within the receptacle 76 of the drive portion 68b such that the pinned portion 68c can freely rotate within the receptacle 76. It will be readily understood by one skilled in the art that rotation of the drive portion 68b will generate centrifugal forces that are applied to the pinned portion 68c and, more specifically, to the crank pin 66. Hence, as the drive portion 68b rotates the centrifugal forces will be exerted on the crank pin 66 such that the crank pin 66, and moreover, the crank pin center axis PA, will be pushed toward its most radially outward position, as illustrated in FIGS. 6A and 6B.

When the tool 10 is operating when there is no load on the drive shaft 28, as in the case where the drive shaft 28 is not operatively engaged with an object to be turned, there will also be no load on the pinned portion 68c, other than the frictional forces created by the cooperative operation of the components of the tool 10, referred to herein as the no-load frictional forces. Moreover, there will be no load on the drive portion 68b, i.e., no resistance to rotation of the drive portion 68b, such that the drive portion 68b will rotate at a no-load speed that is dictated by the rotational speed of the rotor 70. In such instances, the centrifugal forces applied to the crank pin 66 will generally be greater than the no-load frictional forces applied to the crank pin 66. Accordingly, the centrifugal forces will cause the pinned portion 68c to rotate within the receptacle 76 such that the crank pin 66, and hence, the crank pin center axis PA, is forced to its most radially outward position where the offset D will have the maximum length $D_{NL}$ (D no-load), shown in FIG. 6B. The most radially outward position of the crank pin 66, when offset D is equal to $D_{NL}$, will be referred to herein as the 'Home' position of the crank pin 66.

As described above, the speed of rotation and torque delivered at the drive shaft 28 will be a function of the offset D between the center axis PA of the crank pin 66 and the drive portion axis of rotation CA (recalling that the drive portion axis of rotation CA is collinear with the center axis RA of the rotor 70). Specifically, the longer or greater the offset D, the higher the rotational speed of drive shaft 28 will be and the lesser the torque delivered by the draft shaft 28 will be. While conversely, the shorter or lesser the offset D, the lower the rotational speed of drive shaft 28 will be and the greater the torque delivered by the draft shaft 28 will be. Therefore, one skilled in the art will readily understand that when the offset D is equal $D_{NL}$, the radius of orbital rotation of the crank pin center axis PA about the rotor center of axis RA will be equal to $D_{NL}$. Consequently, the orbital rotation of the crank pin 66 will generate a maximum length of oscillatory lateral travel or movement of the drive link 16 in the $X^+$ and $X^-$ directions (shown in FIGS. 6A through 7B). This, in turn, will generate a maximum stroke length of the respective pawl 18 or 20, which in turn will maximally rotate the drive gear 26 with each pawl stroke, thereby delivering the highest rate of rotation and the least amount of torque to the drive shaft 28 deliverable by the tool 10.

Referring now to FIGS. 7A and 7B, when the tool 10 is operated with a load applied the drive shaft 28, as in the case where the drive shaft 28 is operatively engaged with an object to be turned, e.g. operatively connected to a nut or bolt to be tightened or loosened, the load will cause resistance to rotation of the drive shaft 28, which in turn will cause a resistance to orbital rotation of the pinned portion 68c. In such instances, the pinned portion 68c will initially be oriented within the receptacle 76 such that the crank pin 66 is positioned at the Home position where D is substantially equal to $D_{NL}$. However, torque delivered to the drive portion 68b by the rotor 70 will apply rotational force to the drive portion 68, which in turn will apply orbital rotational force on the pinned portion 68c that opposes the resistance to orbital rotation on the pinned portion 68c generated by load. As a consequence of these opposing orbital rotation forces, the pinned portion 68c will begin to rotate within the receptacle 76 such that the eccentric crank pin 66 and crank pin center axis PA will move radially inward toward the drive portion axis of rotation CA.

As described above, in such instances, the crank pin 66 will be initially oriented within at the Home position such that D is substantially equal to $D_{NL}$. Therefore, as the pinned portion 68c rotates within the receptacle 76 and the crank pin center axis PA move radially inward toward the drive portion axis of rotation CA the length of offset D will continuously shorten. That is, the length of the offset D will be reduced as a function of the amount of orbital rotation of the crank pin 66 away from the Home position, which is a function of the load applied to the drive shaft 28. Similar to the embodiments described above, the shortened length of the offset D, when a load is applied to the drive shaft 28, will be illustrated and referred to herein as $D_L$ (D load) and the change in the length of offset D as a function of the load will be illustrated (shown in FIG. 7B) and referred to herein as ΔD (delta D).

As described above, the amount of orbital rotation of the crank pin 66 away from the Home position is a function of the load. More specifically, as will be readily understood by one skilled in the art, as the offset D decreases, i.e., as ΔD increases, the torque generated by the orbital rotation of the pinned portion 68c will correspondingly increase. Hence, as the drive portion 68b rotates causing rotation of the pinned portion 68*c* within the receptacle 76 and orbital rotation of the crank pin 66, ΔD increases causing more torque to be delivered to the drive shaft 28. Thus, the greater the load based resistance to the orbital rotation of the pinned portion 68*c*, the further the crank pin 66 will need to rotate away from the Home position. Moreover, the crank pin 66 will continue to orbitally rotate, thereby increasing ΔD and causing more torque to be delivered to the drive shaft 28 until the torque delivered overcomes the resistance to rotation of the drive shaft 28 created by the load, i.e., the resistance to rotation of the object to which the drive shaft 28 is operatively connected. At which point the drive shaft 28 and the object to which the drive shaft 28 is connected will begin to turn. Additionally, as described below, when the load on the drive shaft 28 reduces, ΔD will also decrease as function of the load based resistance to rotation of the pinned portion 68*c*.

As described above, the speed of rotation and the torque delivered at the drive shaft 28 will be a function of the offset D. Therefore, as the offset D changes, i.e., as ΔD increases and decreases, the speed of rotation and the torque delivered at the drive shaft 28 will increase and decrease as a function of the ΔD. Particularly, the greater the value of ΔD, the slower speed the rotational of the drive shaft 28 will be, and the greater the torque delivered by the draft shaft 28 will be. And conversely, the lesser the value of ΔD, the faster speed the rotational of the drive shaft 28 will be, and the lesser the torque delivered by the draft shaft 28 will be More specifically, when the drive shaft 28 is operatively connected to an object to be turned and the tool motor 72 is operated to rotate the rotor 70, based the load at the drive shaft 28, i.e., the resistance to turning of the object that is transferred to the pinned portion 68*c*, the pinned portion 68*c* will begin to rotate within the receptacle 76 away from the Home position. As the crank pin 66 rotates away from the Home position ΔD increases, thereby decreasing the radius of orbital rotation of the crank pin center axis PA about the rotor center of axis RA. Consequently, as the radius of orbital rotation of the crank pin center axis PA decreases, the orbital rotation of the crank pin 66 will generate less and less oscillatory lateral travel of the drive link 16 in the X⁺ and the X⁻ directions, as illustrated in FIG. 7B. This, in turn will decrease stroke length of the respective pawl 18 or 20, which in turn will reduce the rotation of the drive gear 26 with each pawl stroke, thereby delivering a slower rate of rotation and an increased amount of torque to the drive shaft 28.

Furthermore, when the load at the drive shaft 28 reduces, i.e., when the object operatively connected to the drive shaft 28 begins to turn with less resistance, the resistance to turning of the pinned portion 68*c* will also reduce as a function of the reduction in load. Consequently, the pinned portion 68*c* will rotate within the drive portion receptacle 66, rotating the crank pin 66 back toward the Home position causing ΔD to decrease, thereby increasing the radius of orbital rotation of the crank pin center axis PA about the rotor center of axis RA. Consequently, as the radius of orbital rotation of the crank pin center axis PA increases, the orbital rotation of the crank pin 66 will generate more and more oscillatory lateral travel of the drive link 16 in the X⁺ and the X⁻ directions, as illustrated in FIG. 6B. This, in turn will increase the stroke length of the respective pawl 18 or 20, which in turn will increase the rotation of the drive gear 26 with each pawl stroke, thereby delivering a faster rate of rotation and an decreased amount of torque to the drive shaft 28. The crank pin 66 will continue to rotate toward the Home position until the torque delivered to the drive shaft 28 is substantially equal to, or slightly greater than, the torque needed to overcome the resistance to rotation of the object to be turned. As the load continues to lessen, i.e., as resistance to turning of the object operatively connected to the drive shaft 28 continues to lessen, the crank pin 66 will to rotate further back toward the home position, thereby reducing the torque and increasing the rotational speed delivered to the drive shaft 28.

Hence, when operation of the motor 72 delivers a consistent amount of power to tool rotor 70, the rotational speed and amount of torque delivered to the drive shaft 28 at any given time, is a function of ΔD, which is in turn a function of the amount of rotation of the drive portion 68*b* within the pinned portion 68*c*, which is in turn a function of the resistance to turning of the pinned portion 68*c*, which is in turn a function of the load to which the drive shaft 28 is operatively connected, i.e., the resistance to turning of the object to which the drive shaft 28 is operatively connected.

For example, as described above, if a user desires to loosen a tight nut, it would be desirous that the tool 10 initially deliver large torque to the drive shaft 28, even if some rotational speed need be sacrificed. Conversely, as the nut is loosened, torque becomes less necessary and rotational speed can be prioritized over torque. Hence, once the drive shaft 28 is operatively connected to such a nut to be loosened and the motor 72 is operated to turn the drive portion 68*b*, the initial resistance to turning of the nut, i.e., the initial load, will cause the pinned portion 68*c* to rotate within the receptacle 76, thereby rotating the crank pin 66 away from the Home position, and thereby increase ΔD which, as described above, will deliver greater torque to the drive shaft 28. Specifically, the pinned portion 68*c* will continue to rotate within the receptacle 76 until the increase in ΔD causes sufficient torque to be provided to the nut to begin turning the nut slowly. Then, once the nut begins to turn, the load based resistance to orbital rotation of the pinned portion 68*c* will decrease allowing the pinned portion 68*c* to rotate within the receptacle, thereby rotating the crank pin 66 back toward the Home position, thereby decreasing ΔD, which will reduce the torque delivered to the drive shaft 28 and increase the rotational speed of the drive shaft 28.

Accordingly, the speed of rotation and the amount of torque delivered to the drive shaft 28 will automatically increase and decrease as a function of the load on the drive shaft 28, i.e., as a function of the resistance to turning of the object to which the drive shaft 28 is operatively connected. That is, as the resistance to turning of the object operatively connected to the drive shaft 28, i.e., the load, varies, the amount of resistance to turning of the orbital rotation of the pinned portion 68*c* will correspondingly vary, which will correspondingly cause the crank pin 66 to orbitally rotate away from or toward the Home position. Such orbital rotation of the crank pin 66 will correspondingly vary the value of ΔD, which will correspondingly vary the radius of orbital rotation of the crank pin 66, which with will cause a corresponding increase or decrease the rotational speed and amount of torque delivered to the drive shaft 28.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A two-piece planet carrier for use in a power rotary hand tool, wherein the planet carrier is operatively connectable to a drive shaft of the tool, said planet carrier comprising:
    a drive portion having an axis of rotation and fixedly mountable to a motor rotor of the tool; and
    a pinned portion including a base and a crank pin extending eccentrically from the base, the crank pin having a center axis and operatively connectable to the drive shaft to provide rotation and torque to the drive shaft upon orbital rotation of the crank pin about the drive portion axis of rotation, the pinned portion rotatably engaged with the drive portion such that rotation of the rotor will cause the drive portion and the pinned portion to rotate relative to each other as a function of a load applied to the drive shaft such that an offset between the crank pin center axis and the drive portion axis of rotation is variable as a function of the load applied to the drive shaft, wherein the variance of the offset will vary a rotational speed and an amount of torque delivered to the drive shaft as a function of the load at drive shaft.

2. The planet carrier of claim 1, wherein the pinned portion is rotatably disposed within a receptacle eccentrically disposed within a head of the drive portion such that the pinned portion will rotate within the receptacle as a function of the load on the drive shaft, thereby varying the offset between the crank pin center axis and the drive portion axis of rotation as a function of the load on the drive shaft.

3. The planet carrier of claim 2, wherein the pinned portion is rotatably disposed within the receptacle such that the orbital rotation of crank pin about the drive portion axis of rotation will generate centrifugal forces exerted on the crank pin that push the crank pin radially outward in opposition to forces exerted by the load on drive shaft that are transferred to the crank pin, thereby varying the offset between the crank pin center axis and the drive portion axis of rotation as a function of the load on the drive shaft, and thereby varying the rotational speed and the amount of torque delivered to the drive shaft as a function of the load at drive shaft.

4. The planet carrier of claim 1, wherein the drive portion is rotatably disposed within a hollow interior of a base of the pinned portion such that the drive portion will rotate within the pinned portion as a function of the load on the drive shaft, thereby varying the offset between the crank pin center axis and the drive portion axis of rotation as a function of the load on the drive shaft.

5. The planet carrier of claim 4, wherein the drive portion comprises a sidewall structured to have a cam-shaped outer surface that will rotate eccentrically relative to the drive portion axis of rotation.

6. The planet carrier of claim 5, wherein the cam-shaped outer surface of the drive portion is structured and operable to generate frictional forces at an interface between the drive portion outer surface and the inner surface of pinned portion base as the drive portion rotates within the pinned portion.

7. The planet carrier of claim 6, wherein the drive portion is structured and operable to rotate within the pinned portion such that the frictional forces apply rotational force on the pinned portion to orbitally rotate the crank pin in opposition to forces exerted by the load on drive shaft that are transferred to the crank pin such that the drive portion will rotate within the pinned portion as a function of the load on the drive shaft, thereby varying the offset between the crank pin center axis and the drive portion axis of rotation as a function of the load on the drive shaft, and thereby varying the rotational speed and the amount of torque delivered to the drive shaft as a function of the load at drive shaft.

8. A power rotary hand tool, said tool comprising:
a drive shaft operatively connectable to a load; and
a two-piece planet carrier operatively connected to the drive shaft of the tool, said planet carrier comprising:
a drive portion having an axis of rotation and fixedly mounted to a motor rotor of the tool; and
a pinned portion including a base and a crank pin extending eccentrically from the base, the crank pin having a center axis and operatively connected to the drive shaft to provide rotation and torque to the drive shaft upon orbital rotation of the crank pin about the drive portion axis of rotation, the pinned portion rotatably engaged with the drive portion such that rotation of the rotor will cause the drive portion and the pinned portion to rotate relative to each other as a function of a load applied to the drive shaft such that an offset between the crank pin center axis and the drive portion axis of rotation is variable as a function of the load applied to the drive shaft, wherein the variance of the offset will vary a rotational speed and an amount of torque delivered to the drive shaft as a function of the load at drive shaft.

9. The tool of claim 8, wherein the pinned portion is rotatably disposed within a receptacle eccentrically disposed within a head of the drive portion such that the pinned portion will rotate within the receptacle as a function of the load on the drive shaft, thereby varying the offset between the crank pin center axis and the drive portion axis of rotation as a function of the load on the drive shaft.

10. The tool of claim 9, wherein the pinned portion is rotatably disposed within the receptacle such that the orbital rotation of crank pin about the drive portion axis of rotation will generate centrifugal forces exerted on the crank pin that push the crank pin radially outward in opposition to forces exerted by the load on drive shaft that are transferred to the crank pin, thereby varying the offset between the crank pin center axis and the drive portion axis of rotation as a function of the load on the drive shaft, and thereby varying the rotational speed and the amount of torque delivered to the drive shaft as a function of the load at drive shaft.

11. The tool of claim 8, wherein the drive portion is rotatably disposed within a hollow interior of a base of the pinned portion such that the drive portion will rotate within the pinned portion as a function of the load on the drive shaft, thereby varying the offset between the crank pin center axis and the drive portion axis of rotation as a function of the load on the drive shaft.

12. The planet carrier tool of claim 11, wherein the drive portion comprises a sidewall structured to have a cam-shaped outer surface that will rotate eccentrically relative to the drive portion axis of rotation.

13. The tool of claim 12, wherein the cam-shaped outer surface of the drive portion is structured and operable to generate frictional forces at an interface between the drive portion outer surface and the inner surface of pinned portion base as the drive portion rotates within the pinned portion.

14. The tool of claim 13, wherein the drive portion is structured and operable to rotate within the pinned portion such that the frictional forces apply rotational force on the pinned portion to orbitally rotate the crank pin in opposition to forces exerted by the load on drive shaft that are transferred to the crank pin such that the drive portion will rotate within the pinned portion as a function of the load on the drive shaft, thereby varying the offset between the crank pin center axis and the drive portion axis of rotation as a function of the load on the drive shaft, and thereby varying the rotational speed and the amount of torque delivered to the drive shaft as a function of the load at drive shaft.

15. A bidirectional hand held power ratchet drive tool, said tool comprising:
a drive shaft fixedly connected to a drive gear;
a pair of opposing pawls pivotally connected a drive link, each pawl operatively engageable with the drive gear to rotate the drive shaft in response to oscillatory lateral movement of the drive link; and a two-piece planet carrier comprising:
   a drive portion having an axis of rotation and fixedly mounted to a motor rotor of the tool; and
   a pinned portion including a base and a crank pin extending eccentrically from the base, the crank pin having a center axis and rotatably connected with the drive link to provide the oscillatory lateral travel of the drive link upon orbital rotation of the crank pin about the drive portion axis of rotation, the pinned portion rotatably engaged with the drive portion such that rotation of the rotor will cause the drive portion and the pinned portion to rotate relative to each other as a function of a load applied to the drive shaft such that an offset between the crank pin center axis and the drive portion axis of rotation is variable as a function of the load applied to the drive shaft, wherein the variance of the offset will vary a speed and a length of the oscillatory lateral travel of the drive link, thereby varying a rotational speed and an amount of torque delivered to the drive shaft as a function of the load at drive shaft.

16. The tool of claim 15, wherein the pinned portion is rotatably disposed within a receptacle eccentrically disposed within a head of the drive portion such that the pinned portion will rotate within the receptacle as a function of the load on the drive shaft, thereby varying the offset between the crank pin center axis and the drive portion axis of rotation as a function of the load on the drive shaft.

17. The tool of claim 16, wherein the pinned portion is rotatably disposed within the receptacle such that the orbital rotation of crank pin about the drive portion axis of rotation will generate centrifugal forces exerted on the crank pin that push the crank pin radially outward in opposition to forces exerted by the load on drive shaft that are transferred to the crank pin, thereby varying the offset between the crank pin center axis and the drive portion axis of rotation as a function of the load on the drive shaft, and thereby varying the rotational speed and the amount of torque delivered to the drive shaft as a function of the load at drive shaft.

18. The tool of claim 15, wherein the drive portion is rotatably disposed within a hollow interior of a base of the pinned portion such that the drive portion will rotate within the pinned portion as a function of the load on the drive shaft, thereby varying the offset between the crank pin center axis and the drive portion axis of rotation as a function of the load on the drive shaft.

19. The tool of claim 18, wherein the drive portion comprises a sidewall structured to have a cam-shaped outer surface that will rotate eccentrically relative to the drive portion axis of rotation, wherein the cam-shaped outer surface of the drive portion is structured and operable to generate frictional forces at an interface between the drive portion outer surface and the inner surface of pinned portion base as the drive portion rotates within the pinned portion.

20. The tool of claim 19, wherein the drive portion is structured and operable to rotate within the pinned portion such that the frictional forces apply rotational force on the pinned portion to orbitally rotate the crank pin in opposition to forces exerted by the load on drive shaft that are transferred to the crank pin such that the drive portion will rotate within the pinned portion as a function of the load on the drive shaft, thereby varying the offset between the crank pin center axis and the drive portion axis of rotation as a function of the load on the drive shaft, and thereby varying the rotational speed and the amount of torque delivered to the drive shaft as a function of the load at drive shaft.

* * * * *